(12) United States Patent
Knizner

(10) Patent No.: US 6,540,425 B1
(45) Date of Patent: Apr. 1, 2003

(54) JOINING DEVICE FOR CONSTRUCTING ARTS AND CRAFTS PROJECTS

(76) Inventor: Bob Knizner, 913 Meadow Dr., Copper Canyon, TX (US) 75077

( * ) Notice: Subject to any disclaimer, the term of this patent is extended or adjusted under 35 U.S.C. 154(b) by 0 days.

(21) Appl. No.: 09/562,848

(22) Filed: May 1, 2000

(51) Int. Cl.[7] .............................. F16D 1/00; F16B 29/00
(52) U.S. Cl. ........................... 403/24; 403/60; 411/510
(58) Field of Search ...................... 403/24, 60; 411/510

(56) References Cited

U.S. PATENT DOCUMENTS

| | | | | |
|---|---|---|---|---|
| 1,803,431 A | * | 5/1931 | Hill | |
| 2,233,901 A | * | 3/1941 | Scacchetti | |
| 4,454,699 A | * | 6/1984 | Strobl | |
| 4,568,215 A | * | 2/1986 | Nelson | |
| 4,705,442 A | * | 11/1987 | Fucci | |
| D293,880 S | * | 1/1988 | Takahashi | |
| 4,875,641 A | * | 10/1989 | Endo et al. | 411/510 |
| 4,936,530 A | * | 6/1990 | Wollar | |
| 5,286,130 A | * | 2/1994 | Mueller | 403/60 |
| 5,702,196 A | * | 12/1997 | Petercsak | 403/60 |
| 5,907,891 A | * | 6/1999 | Meyer | |

* cited by examiner

Primary Examiner—Lynne H. Browne
Assistant Examiner—Ernesto Garcia
(74) Attorney, Agent, or Firm—Godwin Gruber, P.C.; Arthur I. Navarro

(57) ABSTRACT

A joining device 10 for constructing arts and crafts projects. The joining device 10 comprises a stem piece 14 having a first end 11 terminating in a base 18 with threads 20 substantially encircling the base 18, and a second end 13 having a plurality of fins 12 attached thereto. The joining device 10 also comprises an extension 24 with a first end 15 coupled to the stem piece 14 adjacent to the base 18 and a second end 17 having a hinging member 26, 28 thereon. A wall 22 between the base 18 and the extension 24 acts in retaining the joining device 10 firmly against an arts and crafts article 34 near the base 18. Two joining devices 10 secured by their respective hinging members 26, 28 form a joint assembly 25 beneficial in building arts and crafts projects in order to provide for a connection between parts via a hinge 42 and controlled rotation around the hinge 42.

19 Claims, 7 Drawing Sheets

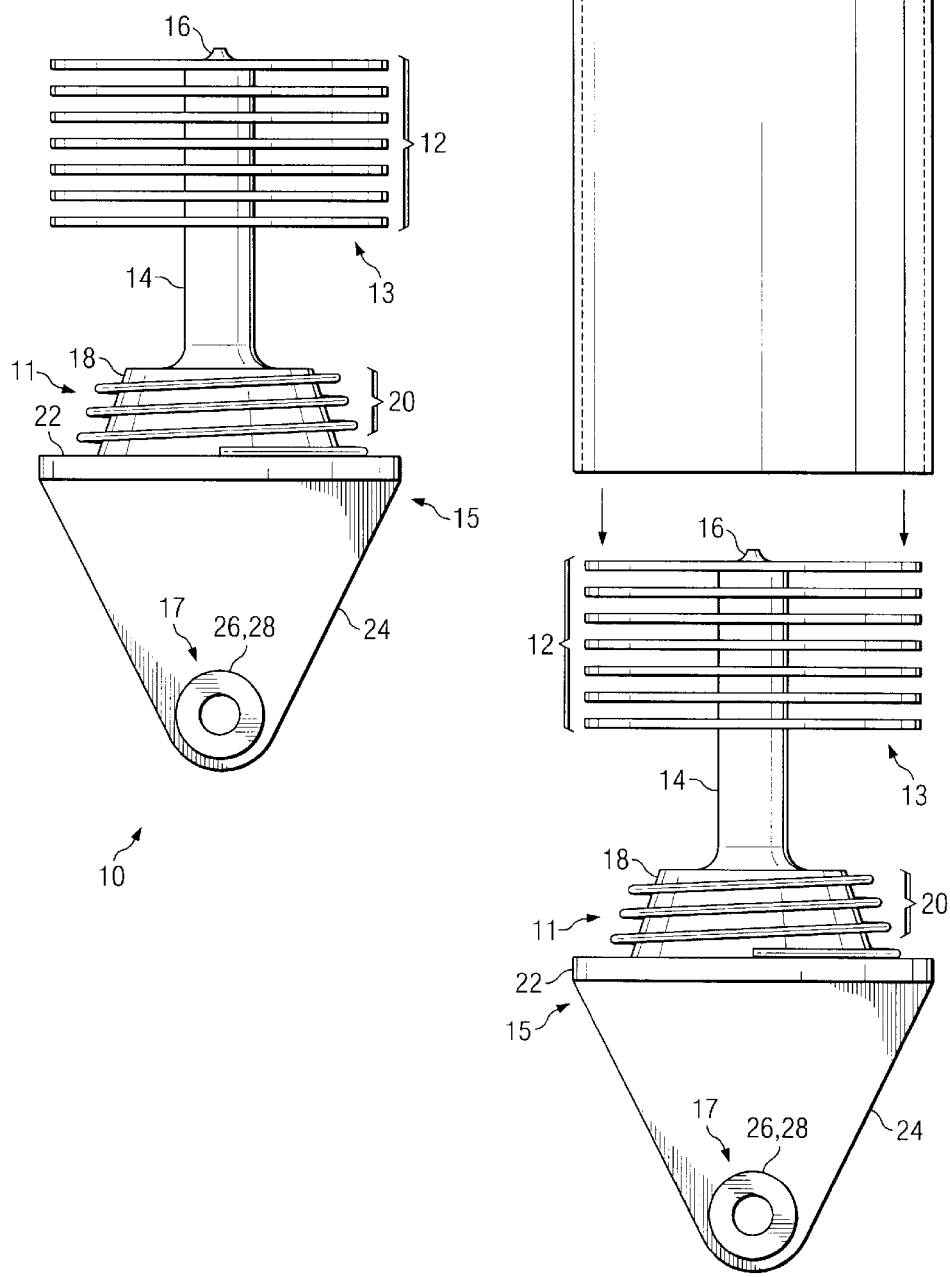

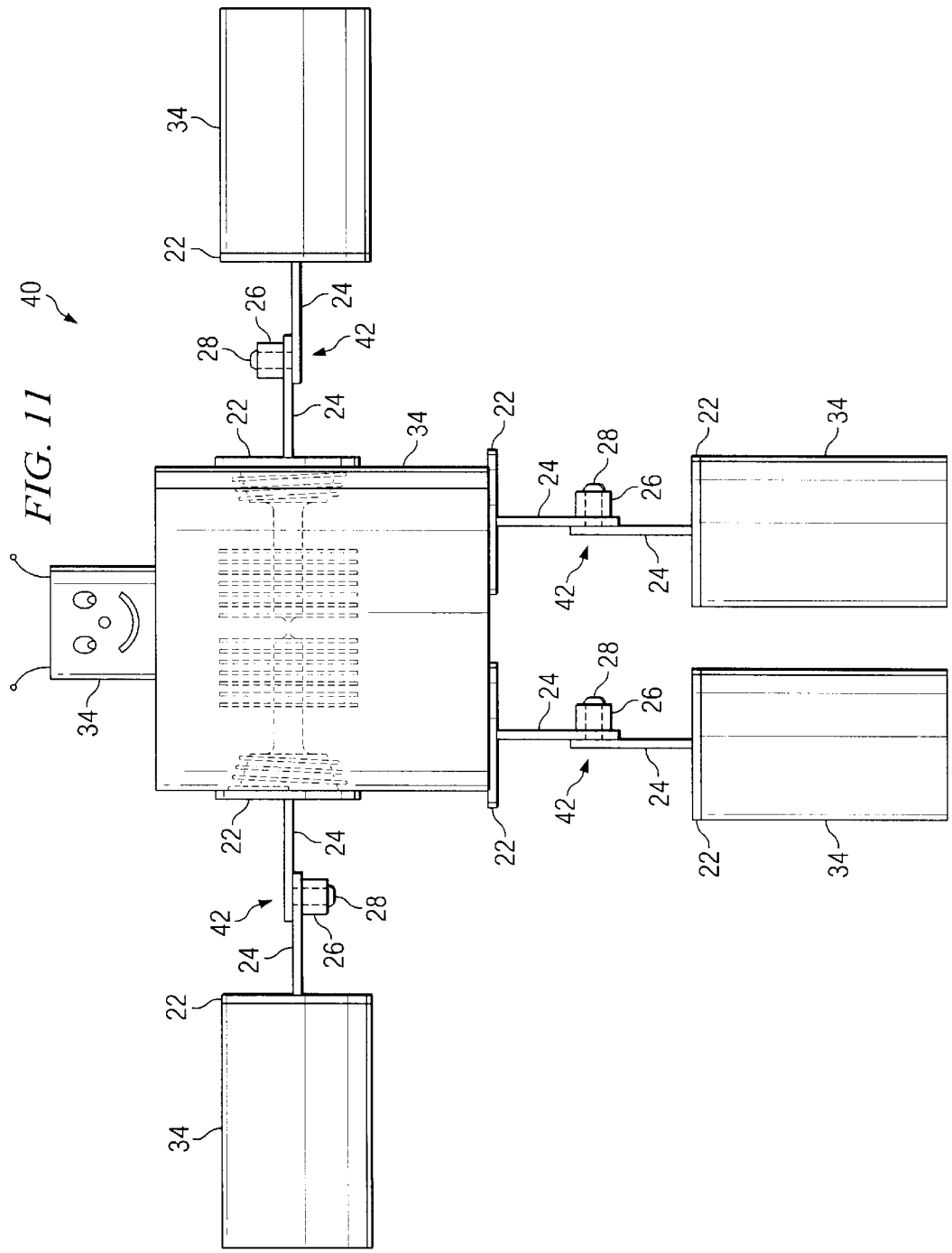

JOINING DEVICE FOR CONSTRUCTING ARTS AND CRAFTS PROJECTS

FIELD OF THE INVENTION

This invention relates in general to joint assemblies for constructing arts and crafts projects. In particular, the invention relates to a joining device comprising a hinging member for building arts and crafts projects using cardboard paper towel/toilet paper tubes and small cardboard boxes.

BACKGROUND OF THE INVENTION

Without limiting the scope of the invention, its background is described in connection with joint assemblies for constructing arts and crafts projects.

Substantial interest has long been given by the public and schools to arts and crafts projects. Schools have implemented such projects to allow their students to gain artistic skills, as well as broaden their creativity with visual effects.

Projects in the educational arena range from building robots in early stages of classroom activity to building the Solar System for a science fair. Such projects utilize cardboard boxes and/or cardboard paper towel/toilet paper tubes in order to build these projects in an idealistic and inexpensive manner. However, most of the various pieces are glued or taped to one another, not allowing for mobility which may be realistic in, for example, a robot.

As such, a need exists for a joining device which provides for connecting parts of arts and crafts projects together. In addition, a need exists for a joint assembly which provides for realistic movement (i.e., rotation) in arts and crafts projects.

SUMMARY OF THE INVENTION

The present invention provides for a joining device which can be utilized in connecting parts of arts and crafts projects together. The present invention also provides for a joint assembly which allows for movement to be present in arts and crafts projects.

Disclosed in one embodiment is a joining device for constructing arts and crafts projects. The joining device comprises a stem piece having a first end and a second end. The first end terminates in a base with threads substantially encircling the base. The second end has a plurality of fins attached thereto which are circular in shape. The fins further include a recess adapted to accept a writing utensil, such as a pencil or crayon, for marking the approximate size aperture needed to accept the joining device. The stem piece also comprises a blunt point terminating at the second end. The blunt point can be used as part of a compass along with the pencil and/or crayon in marking the correct size hole to be cut into a cardboard box, for example.

The joining device also comprises an extension with a first end coupled to the stem piece adjacent to the base and a second end having a hinging member thereon. In one embodiment, the hinging member comprises a pin integrally cast in the extension which is substantially flat. In an alternative embodiment, the hinging member comprises a receiving end extending from the extension. The receiving end is adapted to accept the pin in order to form a hinge.

The joining device further comprises a wall between the base and the extension. The wall acts to retain the joining device firmly against an arts and crafts article near the base. Such arts and crafts articles may include cardboard paper towel/toilet paper tubes and/or cardboard boxes.

Disclosed in another embodiment is a joint assembly for constructing arts and crafts projects which include cardboard paper towel/toilet paper tubes and/or cardboard boxes. The joint assembly comprises a first joining device having a first end and a second end. The first end terminates in an extension comprising a first hinging member thereon. The first hinging member comprises a receiving end extending from the extension which is substantially flat. The second end has a plurality of fins attached thereto.

The joint assembly also comprises a second joining device having a first end and a second end. The first end terminates in an extension comprising a second hinging member thereon. The second hinging member comprises a pin integrally cast in the extension. As such, the first hinging member, which comprises a receiving end, is adapted to receive and secure the pin and/or second hinging member. Together, the first hinging member and second hinging member form a hinge providing controlled rotation around the hinge. The second end of the second joining device has a plurality of fins attached thereto which are circular in shape. The fins of the first joining device and/or second joining device include a recess adapted to accept a writing utensil, such as a pencil or crayon, for marking the approximate size aperture needed to accept the joining device.

The first joining device and the second joining device further include a stem piece having a first end and a second end. The first end terminates in a base with threads substantially encircling the base. The second end has a plurality of fins attached thereto. An extension, which is substantially flat, is coupled to the stem adjacent to the base. The stem also comprises a blunt point terminating at the second end, which is utilized as a compass along with a writing utensil in order to mark the correct size hole to be cut into a cardboard box, for example. The first joining device and second joining device are made of lightweight, durable and flexible plastic material.

An advantage of the present invention includes the ability for Kids to create numerous arts and crafts projects using common household items such as cardboard boxes and toilet paper tubes. Another advantage of the present invention includes the relative ease of manufacturing the joining device of the present invention and low costs associated therewith.

BRIEF DESCRIPTION OF THE DRAWINGS

For a more complete understanding of the present invention including its features and advantages, reference is made to the following detailed description of the invention in conjunction with the accompanying drawings of which:

FIG. 7 is a top view of a joining device, in accordance with the preferred embodiment of the present invention;

FIG. 8 illustrates the insertion of a joining device into a cardboard toilet paper tube, in accordance with the preferred embodiment of the present invention;

FIG. 11 illustrates a robot utilizing a plurality of joint devices, in accordance with one embodiment of the present invention.

Corresponding numerals and symbols in the figures refer to corresponding parts in the detailed description, unless otherwise indicated.

DETAILED DESCRIPTION OF THE PREFERRED EMBODIMENTS

While the making and using of various embodiments of the present invention are discussed in detail below, it should be appreciate that the present invention provides many applicable inventive concepts which can be embodied in a wide variety of specific contexts. The specific embodiments discussed herein are merely illustrative of specific ways to make and use the invention, and do not delimit the scope of the invention.

The preferred embodiment of the joining device 10 of the invention is illustrated in FIGS. 1 through 11. The joining device 10 for constructing arts and crafts projects comprises a stem piece 14, an extension 24 and a wall 22.

Figure 1:
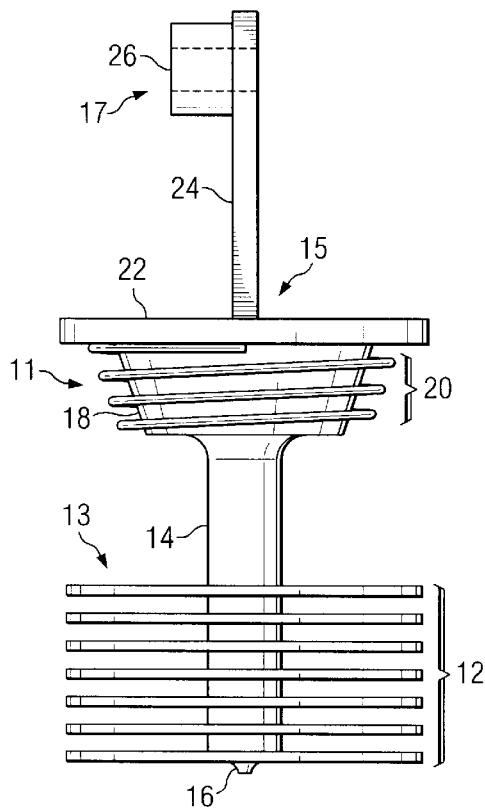
FIG. 1 is a perspective view of a joining device with a receiving end, according to the preferred embodiment of the invention.
Figure 4:
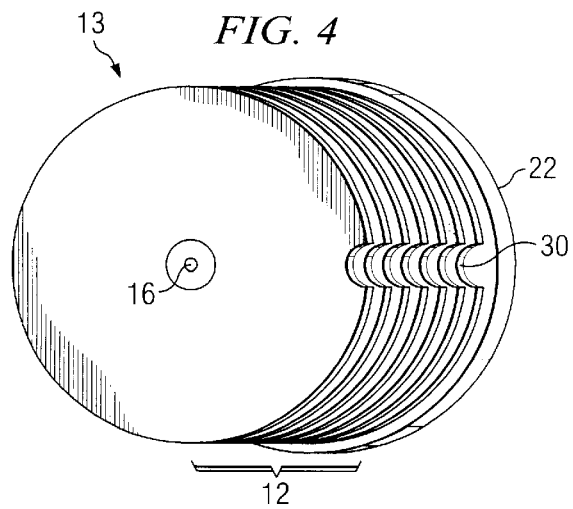
FIG. 4 shows one end of the joining device and illustrates the recess included in the fins of the preferred embodiment of the present invention.
Figure 5:
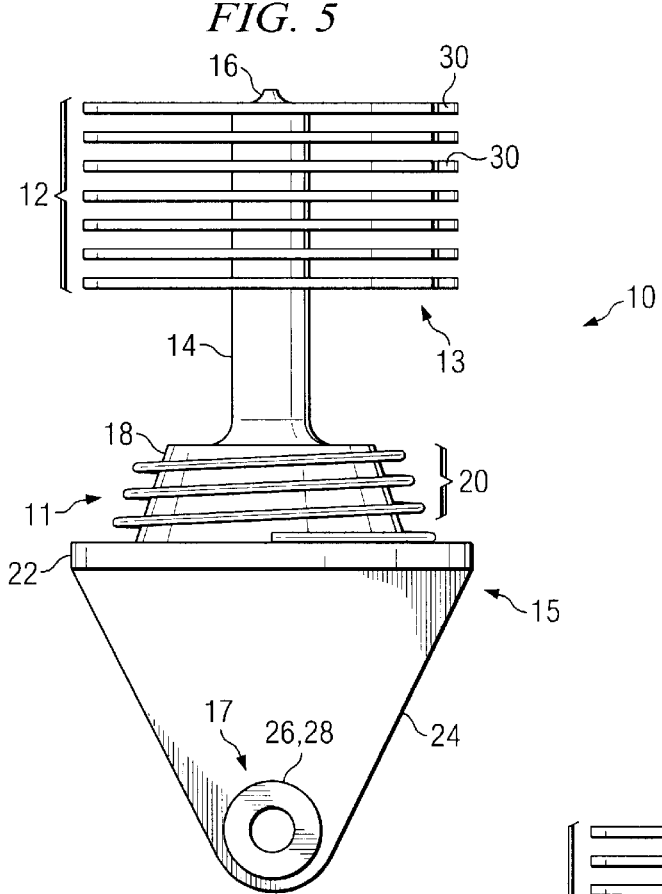
FIG. 5 is a perspective view of a joining device with a recess included in the fins, in accordance with the preferred embodiment of the present invention.
Figure 6:
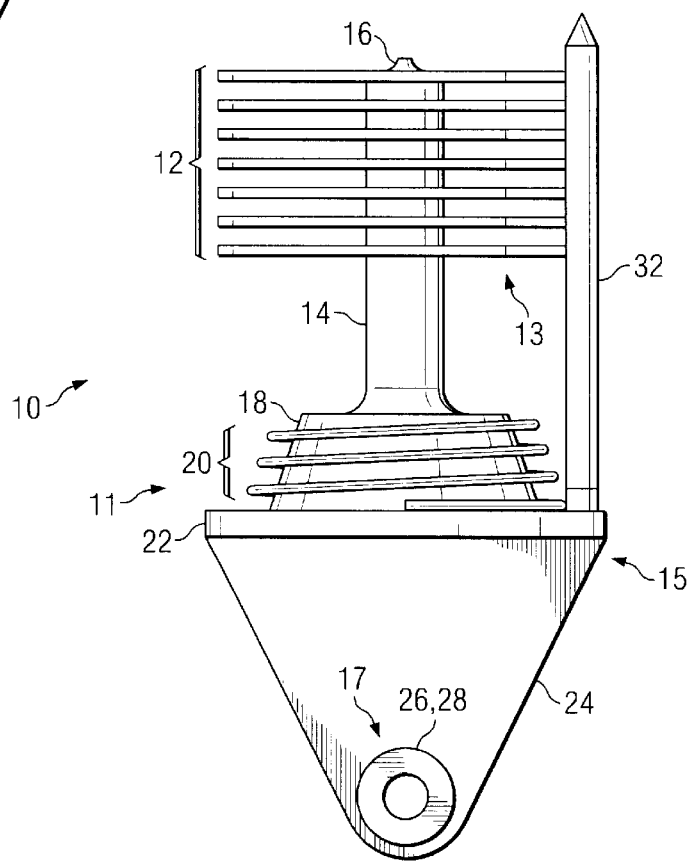
FIG. 6 shows a writing utensil, such as a crayon or pencil, in the recess of the fins, in accordance with the preferred embodiment of the present invention.

As shown, the stem piece 14 has a first end 11 and a second end 13. The first end 11 terminates in a base 18 with threads 20 substantially encircling the base 18. The second end 13 has a plurality of fins 12 attached thereto, as shown in FIG. 1. The fins 12 are circular layers prearranged on the stem piece 14, as shown in FIG. 4. The fins 12 further include a recess 30, as shown in FIG. 5, adapted to accept a writing utensil, such as a pencil or crayon 32, for marking the approximate size aperture needed to accept the joining device 10. Once a pencil or crayon 32 has been inserted into the recess 30 as shown in FIG. 6, a blunt point 16 terminating at the second end 13 of the stem 14 is used as a center point marker, while the crayon 32 is utilized as a compass in drawing a circle the approximate size of a fin 12.

Figure 2:
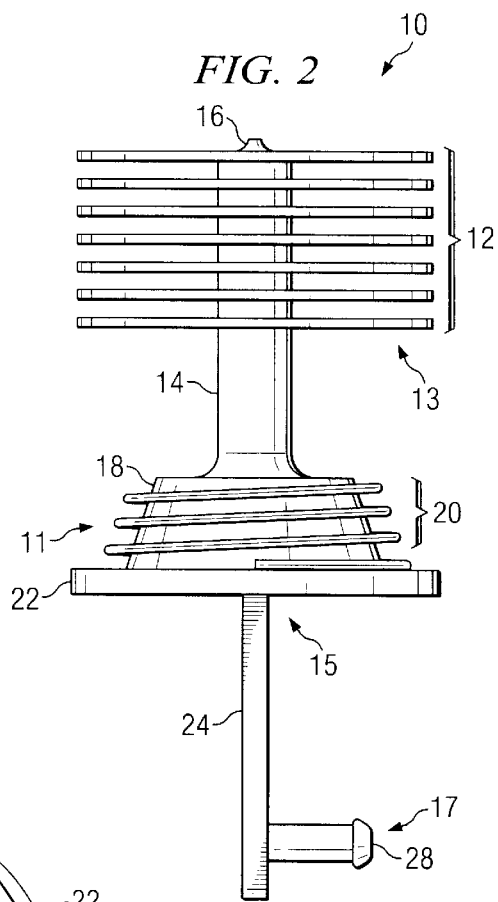
FIG. 2 is a perspective view of a joining device with a pin integrally cast in the extension of the preferred embodiment of the invention.
Figure 9:
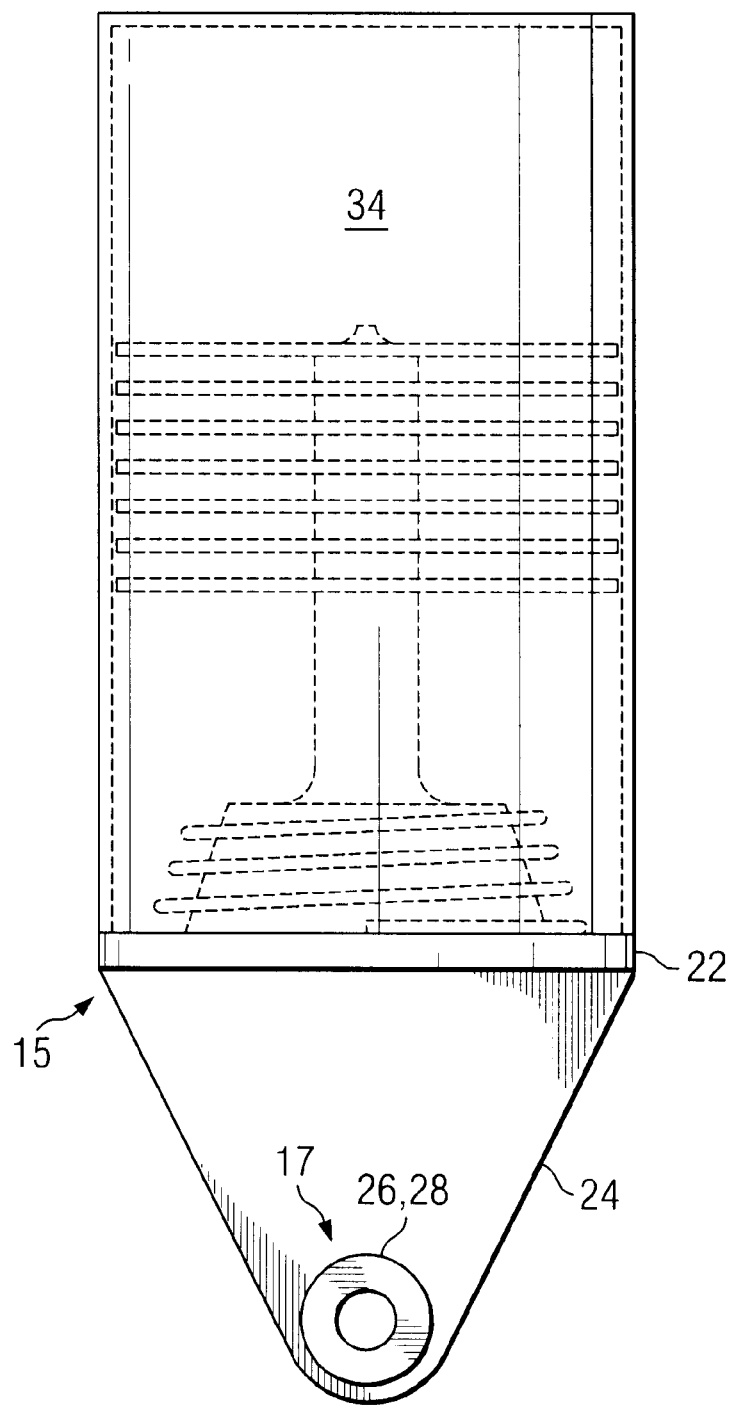
FIG. 9 is a transparent view of the present invention showing the toilet paper tube abutting the wall between the base and extension once the joining device has been inserted into the tube.

The extension 24 has a first end 15 coupled to the stem piece 14 adjacent to base 18 and a second end 17 having a hinging member 26, 28 thereon. As shown in FIG. 1, the hinging member 26, 28 comprises a receiving end 26 extending from the extension 24. Alternatively, the hinging member 26, 28, as shown in FIG. 2, comprises a pin 28 integrally cast in the extension 24. Thus, the receiving end 26 is adapted to accept and secure the pin 28 in order to form a hinge 42. This connection, or joinder, allows for rotational motion as may be needed in constructing a robot 40 or reindeer, for example. Furthermore, between the base 18 and the extension 24, which is substantially flat, is a wall 22 acting to retain the joining device 10 firmly against an arts and crafts article 34 near the base 18, as shown in FIG. 9.

Figure 3:
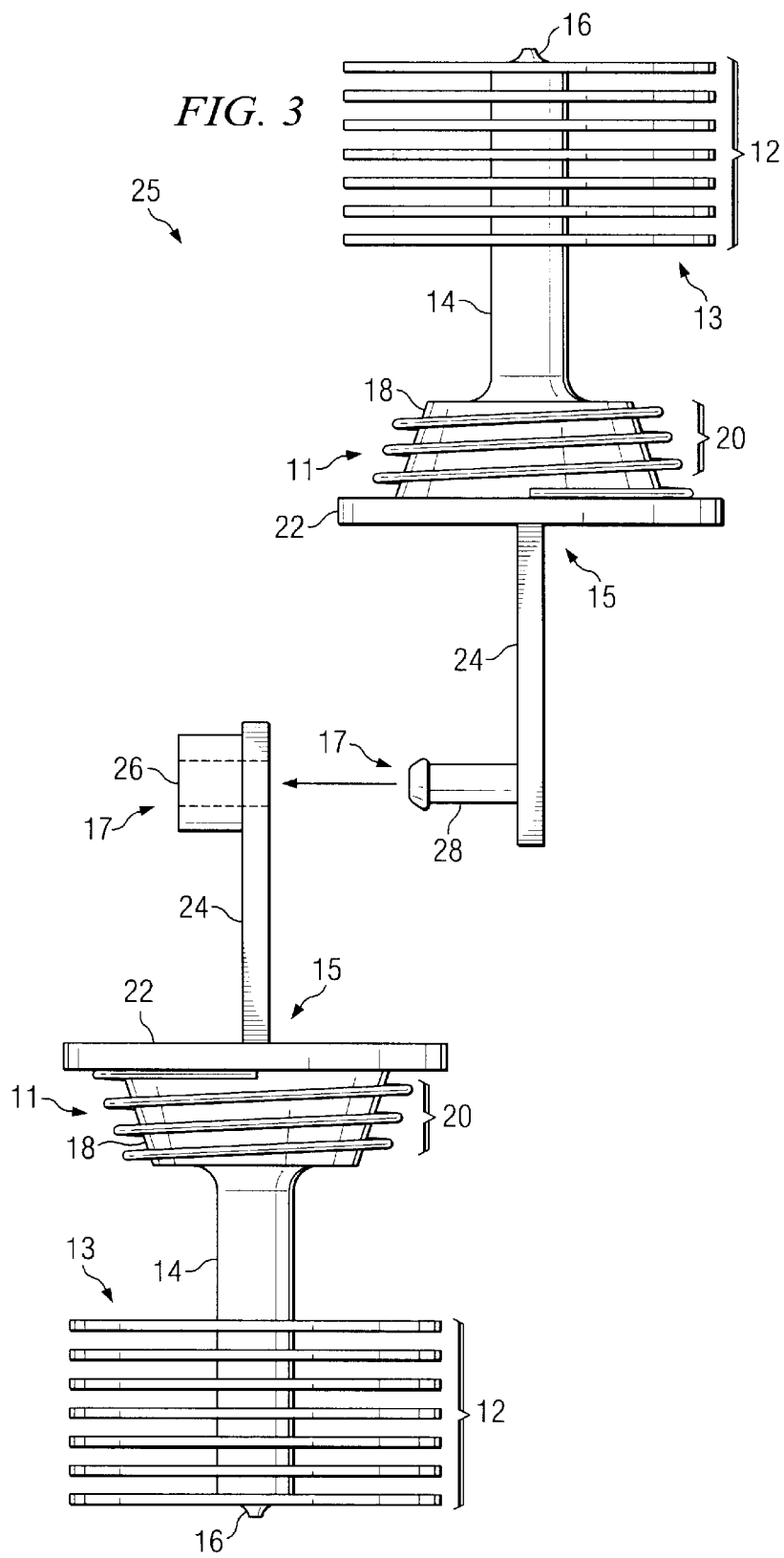
FIG. 3 illustrates the receiving end of one joining device receiving the pin of another joining device in order to form a joint assembly, in accordance with the preferred embodiment of the invention.

In one embodiment, the joining device 10 can be used to construct a robot 40 as shown in FIG. 11 as an arts and crafts project. A cardboard box 34 is used to define the body of the robot 40. A crayon or pencil 32 is inserted into the recess 30 of the fins 12 as shown in FIG. 6. That is, in one embodiment, the recess 30 is set to accommodate a writing utensil the length of a crayon 32. The point 16 is placed on one side of the cardboard box 34 marking the center point of the circle to be drawn. The fins 12 are then rotated in a circular motion while the tip of the crayon 32 marks the approximate size aperture needed to accept the joining device 10. The crayon 32 is then removed in order to insert the joining device 10 into the marked aperture on the cardboard box 34. The joining device 10 includes flexible fins 12, which can be inserted into the cardboard box 34 while being firmly retained. That is, the joining device 10 is a single molded component which can be manufactured using a lightweight, durable and flexible plastic material and/or other polyurethane materials. This results in the relative ease of manufacturing the joining device 10 and low costs associated therewith. The threads 20 encircling the base 18 allow for the joining device 10 to be screwed into a cardboard box 34, for example, through a rough cut pilot hole. Thus, the threads 20 allow for the joining device 10 to be engaged into the cardboard box 34. Once the joining device 10 is inserted into the cardboard box 34, the wall 22 is used to retain the joining device 10 firmly against the cardboard box 34 near the base 18. In one embodiment, the joining device 10 inserted into the cardboard box 34 includes a receiving end 26 at one end 17 of the extension 24. Therefore, in order to form an arm for the robot 40 in FIG. 11, the joining device 10 comprising a pin 28 integrally cast in the extension 24 is to be used in order to form a joint assembly 25 as shown in FIG. 3. That is, the receiving end 26 is adapted to receive and secure the pin 28 in order to form a hinge 42 providing controlled rotation around the hinge 42.

Figure 10:
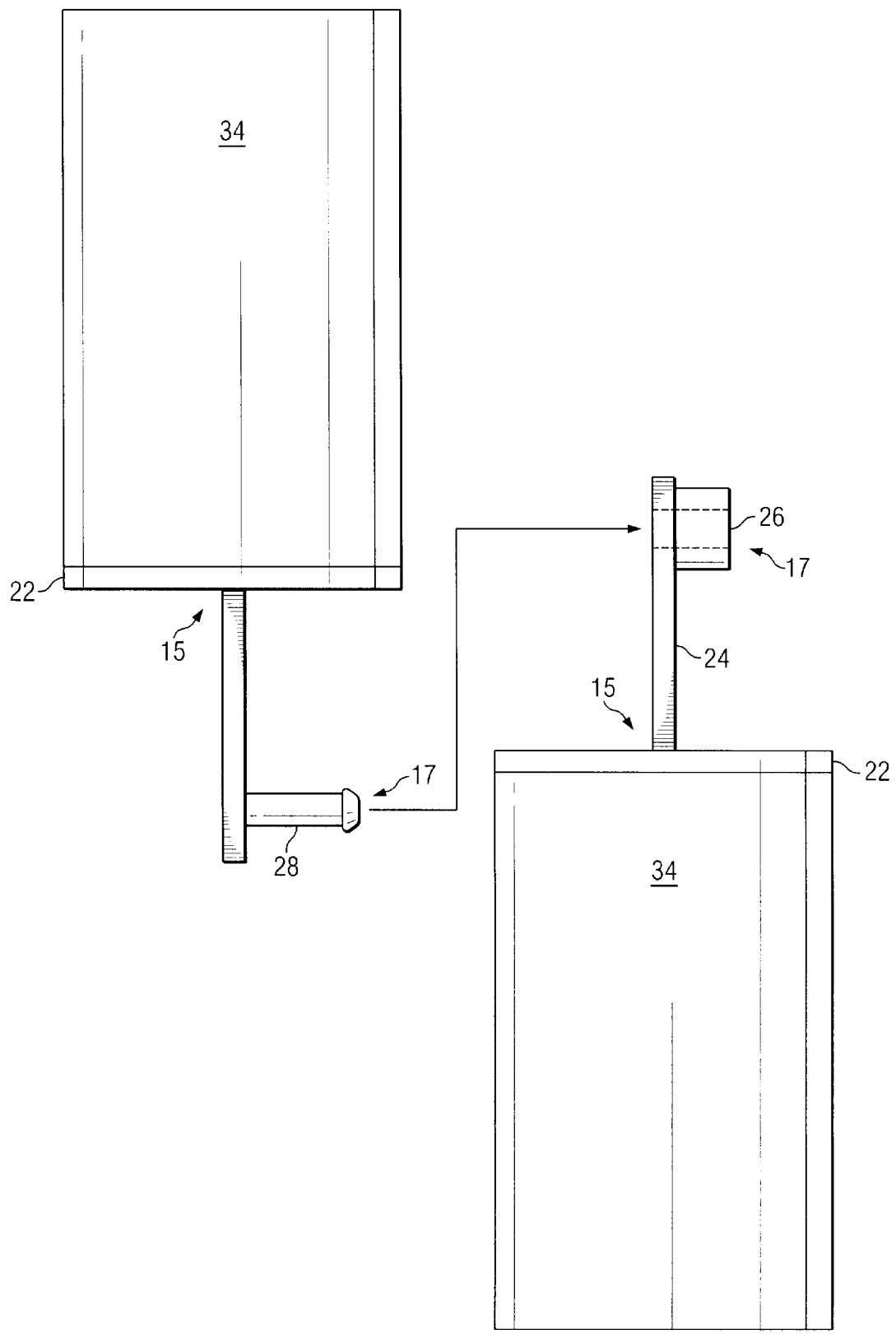
FIG. 10 shows two joining devices, or joint assembly, one with a receiving end and another with a pin integrally cast into the extension, both inserted into cardboard toilet paper tubes.

In order to form the rest of the arm of the robot 40 in FIG. 11, the fins 12 of the joining device 10 are inserted into a cardboard paper towel or toilet paper tube 34, as shown in FIG. 8. The fins 12 are flexible in order to allow them to be inserted into a cardboard tube 34 and be firmly retained. The fins 12 are approximately the same in diameter as a cardboard paper towel/toilet paper tube 34. Once the cardboard tube 34 is inserted, the wall 22 will be used to abut the cardboard tube 34 so as to reach an end, as shown in FIGS. 9 and 10. Once the arm has been completed by forming a joint assembly 25 with two joining devices 10, fingers, for example, may be drawn on the cardboard tube 34 in order to add creativity to the robot 40.

The process of forming the arm of the robot 40 is then repeated on the other side of the cardboard box 34, forming a second arm for the robot 40. In addition, the same process for forming the arms of the robot 40 are repeated to form the legs of the robot 40 extending from a second side of the cardboard box 34.

While this invention has been described with a reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the impended claims encompass any such modifications or embodiments.

What is claimed is:

1. A joining device for constructing arts and crafts projects comprising:

a stem piece having a first end and a second end, said first end terminating in a base with threads substantially encircling said base, said second end having a plurality of fins attached thereto;

an extension with a first end coupled to said stem piece adjacent said base and a second end having a hinging member thereon; and a wall between said base and said extension, said wall acting to retain said joining device firmly against an arts and crafts article near said base.

2. The joining device according to claim 1 wherein said fins are circular in shape.

3. The joining device according to claim 1 wherein said hinging member comprises a pin integrally cast in said extension.

4. The joining device according to claim 1 wherein said hinging member comprises a receiving end extending from said extension.

5. The joining device according to claim 1 wherein said stem comprises a blunt point terminating at said second end.

6. The joining device according to claim 4 wherein said receiving end is adapted to accept said pin in order to form a hinge.

7. The joining device according to claim 1 wherein said extension is substantially flat.

8. The joining device according to claim 1 wherein said fins further include a recess adapted to accept a writing utensil, such as a pencil or crayon, for marking the approximate size aperture needed to accept said joining device.

9. The joining device according to claim 1 wherein said joining device is made of a light-weight, durable and flexible plastic material.

10. The joining device according to claim 1 wherein said arts and crafts projects include cardboard paper towel or toilet paper tubes.

11. A joint assembly for constructing arts and crafts projects comprising:

a first joining device having a first end and a second end, said first end terminating in an extension comprising a first hinging member thereon, said second end having a plurality of fins attached thereto;

a second joining device having a first end and a second end, said first end terminating in an extension comprising a second hinging member thereon, said second end having a plurality of fins attached thereto;

wherein said first joining device is adapted to connect with said second joining device, and wherein said first hinging member and said second hinging member together form a hinge providing controlled rotation around said hinge.

12. The joint assembly according to claim 1 wherein said first joining device and said second joining device further include a stem piece having a first end and a second end, said first end terminating in a base with threads substantially encircling said base, said second end having said plurality of fins attached thereto.

13. The joint assembly according to claim 12 wherein said extension is coupled to said stem adjacent said base.

14. The joint assembly according to claim 1 wherein said first hinging member comprises a receiving end extending from said extension, said receiving end adapted to receive and secure said second hinging member.

15. The joint assembly according to claim 1 wherein said second hinging member comprises a pin integrally cast in said extension.

16. The joint assembly according to claim 12 wherein said stem comprises a blunt point terminating at said second end.

17. The joint assembly according to claim 11 wherein said fins further include a recess adapted to accept a writing utensil, such as a pencil or crayon, for marking the approximate size aperture needed to accept said joining device.

18. The joint assembly according to claim 11 wherein said first joining device and said second joining device are made of light-weight, durable and flexible plastic material.

19. The joining device according to claim 11 wherein said arts and crafts projects include cardboard paper towel or toilet paper tubes.

\* \* \* \* \*